United States Patent
Gralhoz et al.

(10) Patent No.: US 9,262,213 B1
(45) Date of Patent: Feb. 16, 2016

(54) DYNAMIC SUGGESTION OF NEXT TASK BASED ON TASK NAVIGATION INFORMATION

(71) Applicant: Juniper Networks, Inc., Sunnyvale, CA (US)

(72) Inventors: Ricardo Augusto R. Gralhoz, San Jose, CA (US); Hal L. Stern, Livingston, NJ (US)

(73) Assignee: Juniper Networks, Inc., Sunnyvale, CA (US)

( * ) Notice: Subject to any disclaimer, the term of this patent is extended or adjusted under 35 U.S.C. 154(b) by 220 days.

(21) Appl. No.: 14/042,300

(22) Filed: Sep. 30, 2013

(51) Int. Cl.
G06Q 10/06 (2012.01)
G06Q 10/10 (2012.01)
G06F 9/48 (2006.01)

(52) U.S. Cl.
CPC .......... *G06F 9/4881* (2013.01); *G06Q 10/0633* (2013.01); *G06Q 10/10* (2013.01)

(58) Field of Classification Search
CPC .................................................. G06F 9/4881
See application file for complete search history.

(56) References Cited

U.S. PATENT DOCUMENTS

| | | | |
|---|---|---|---|
| 4,821,211 A | | 4/1989 | Torres |
| 4,951,190 A | | 8/1990 | Lane et al. |
| 5,115,501 A | | 5/1992 | Kerr |
| 5,420,975 A | * | 5/1995 | Blades et al. ............... 715/811 |
| 5,465,358 A | | 11/1995 | Blades et al. |
| 5,530,861 A | * | 6/1996 | Diamant et al. ............ 705/7.21 |
| 5,726,688 A | | 3/1998 | Siefert et al. |
| 7,065,201 B2 | * | 6/2006 | Bushey et al. ............ 379/265.01 |
| 7,802,197 B2 | | 9/2010 | Lew et al. |
| 2003/0030666 A1 | * | 2/2003 | Najmi et al. ................... 345/745 |
| 2005/0044508 A1 | * | 2/2005 | Stockton ........................ 715/811 |
| 2007/0220505 A1 | * | 9/2007 | Bukovec et al. .............. 717/168 |
| 2008/0177726 A1 | * | 7/2008 | Forbes et al. ................. 718/101 |
| 2009/0015859 A1 | * | 1/2009 | Bothner et al. .............. 358/1.15 |
| 2009/0178004 A1 | * | 7/2009 | Stoval et al. ................... 715/812 |
| 2010/0318995 A1 | * | 12/2010 | Messmer et al. .............. 718/102 |
| 2011/0196853 A1 | * | 8/2011 | Bigham .............. G06F 9/45512 707/706 |
| 2012/0296716 A1 | * | 11/2012 | Barbeau ..................... 705/14.13 |
| 2013/0061259 A1 | | 3/2013 | Raman et al. |
| 2013/0191226 A1 | * | 7/2013 | Smallwood ............ G06Q 30/02 705/14.68 |
| 2013/0326371 A1 | * | 12/2013 | Xu ................................. 715/753 |
| 2014/0257835 A1 | * | 9/2014 | Kashyap ........................... 705/2 |
| 2015/0006564 A1 | * | 1/2015 | Tomkins et al. .............. 707/767 |

FOREIGN PATENT DOCUMENTS

WO    WO 99/66394    12/1999

* cited by examiner

*Primary Examiner* — Abdullah Al Kawsar
(74) *Attorney, Agent, or Firm* — Harrity & Harrity, LLP

(57) ABSTRACT

A device may receive task navigation information, identify a selection of a first task, of multiple tasks, based on the task navigation information, and provide a list of a group of tasks from the multiple tasks. The list of the group tasks may be based on information identifying tasks historically selected subsequent to the selection of the first task. The device may identify a selection of a second task, of the multiple tasks subsequent to identifying the selection of the first task; and store information identifying that the second task has been selected subsequent to the first task based on identifying the selection of the second task subsequent to the selection of the first task. The information identifying that the second task has been selected subsequent to the first task may include a number of times that the second task has been selected subsequent to the first task.

20 Claims, 7 Drawing Sheets

DYNAMIC SUGGESTION OF NEXT TASK BASED ON TASK NAVIGATION INFORMATION

A task tree sometimes includes a list of tasks (e.g., in a user interface of a client device) that a user may select to perform. The task tree can include a list of related tasks (e.g., sub-tasks) that may branch off of a particular task. Organizing tasks and sub-tasks can be convoluted. Also, selecting a series of tasks can be time consuming, as the user may need to navigate through the task tree to select each task to be performed.

SUMMARY

According to some possible implementations, a method may include, receiving, by a device, task navigation information; identifying, by the device, a selection of a first task, of multiple tasks, based on the task navigation information; and providing, by the device, a list of a group of tasks from the multiple tasks, based on identifying the selection of the first task. The list of the group of tasks may be based on information identifying tasks historically selected subsequent to the selection of the first task. The method may include identifying, by the device and based on the task navigation information, a selection of a second task, of the multiple tasks, subsequent to identifying the selection of the first task; and storing, by the device, information identifying that the second task has been selected subsequent to the first task based on identifying the selection of the second task subsequent to the selection of the first task. The information identifying that the second task has been selected subsequent to the first task may include a number of times that the second task has been selected subsequent to the first task. The information identifying that the second task has been selected subsequent to the first task corresponding to the information may identify tasks historically selected subsequent to the selection of the first task.

According to some possible implementations, a device may receive task navigation information; determine a selection of a first task, of multiple tasks, based on the task navigation information; and provide a list of a group of tasks, of the multiple tasks, based on determining the selection of the first task. The list of the group of tasks may be based on information identifying tasks historically selected subsequent to the selection of the first task. The device may determine, based on the task navigation information, a selection of a second task, of the multiple tasks subsequent to determining the selection of the first task; and store information identifying that the second task has been selected subsequent to the first task based on determining the selection of the second task subsequent to the selection of the first task. The information identifying that the second task has been selected subsequent to the first task may include a number of times that the second task has been selected subsequent to the first task. The information identifying that the second task has been selected subsequent to the first task may correspond to the information identifying tasks historically selected subsequent to the selection of the first task. The device may add to the number of times that the second task has been selected subsequent to the first task based on determining that the second task has been selected subsequent to the first task.

According to some possible implementations, a computer-readable medium for storing instructions may include multiple instructions which, when executed by one or more processors associated with a device, cause the one or more processors to: receive a selection of a first task of multiple tasks; and provide a list of a group of the multiple tasks, based on receiving the selection of the first task. The list of the group of the multiple tasks being based on information identifying tasks historically selected subsequent to the selection of the first task. The multiple instructions may further cause the one or more processors to receive a selection of a second task, of the multiple tasks, subsequent to receiving the selection of the first task; and store information identifying that the second task has been selected subsequent to the first task based on receiving the selection of the second task subsequent to the selection of the first task. The information identifying that the second task has been selected subsequent to the first task may include a number of times that the second task has been selected subsequent to the first task. The information identifying that the second task has been selected subsequent to the first task corresponding to the information may identify tasks historically selected subsequent to the selection of the first task.

DETAILED DESCRIPTION

The following detailed description refers to the accompanying drawings. The same reference numbers in different drawings may identify the same or similar elements.

Systems and/or methods, as described herein, may dynamically update a task tree menu based on task navigation information. For example, the task navigation information may identify a user's navigation through the task tree and the user's selections of tasks from the task tree. In some implementations, the task tree may be dynamically updated to organize tasks in a suggestion list that may include a subset of multiple tasks that are likely to be selected subsequent to a current task based on the task navigation information. As a result, a series of likely tasks, associated with the task tree, may be presented for selection by the user based on the task navigation information, thereby saving time in relation to when the user must navigate through the tasks from within the task tree that is not updated based on the task navigation information.

Figure 1:
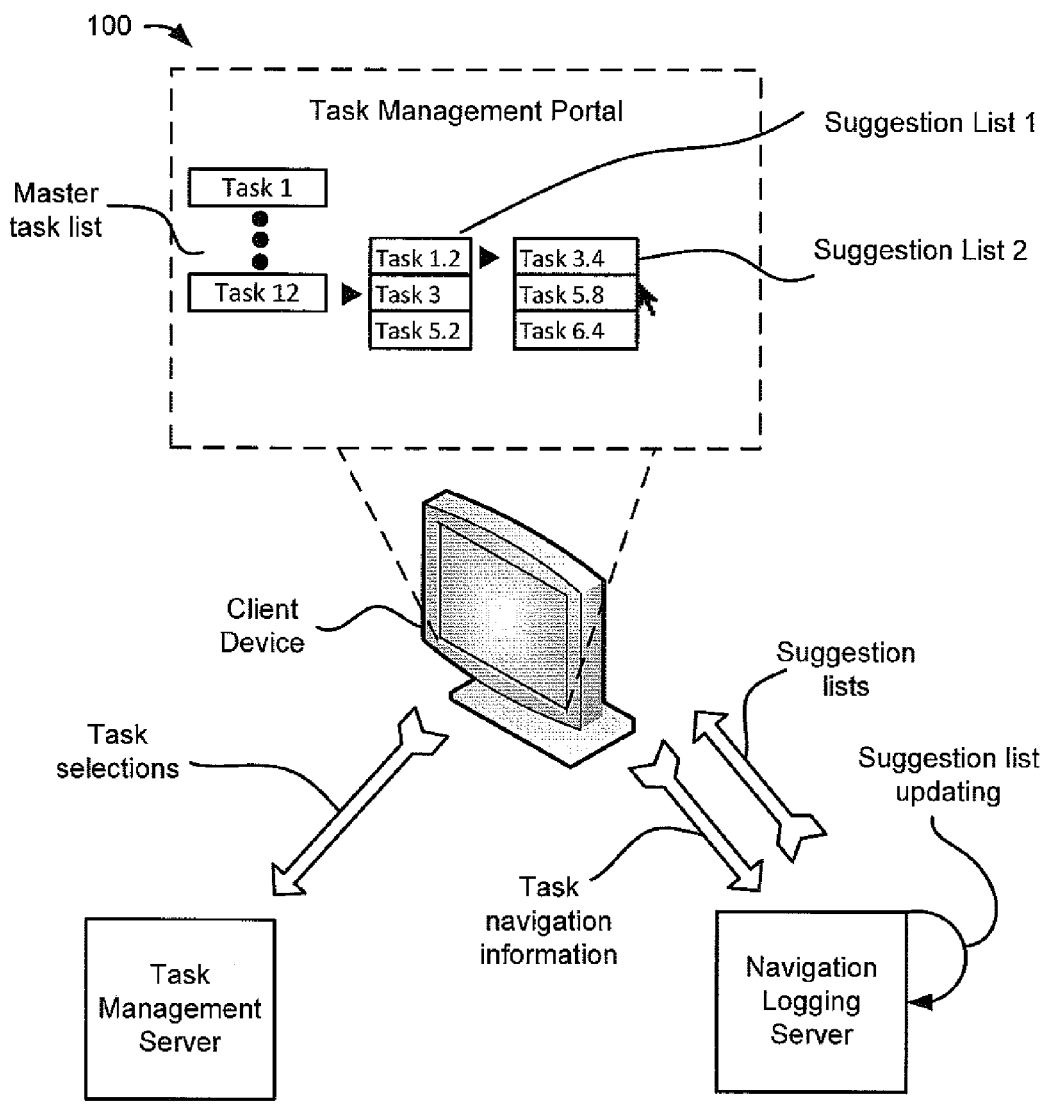
FIG. 1 illustrates an example overview of an implementation described herein.

FIG. 1 illustrates an example overview of an implementation described herein. As shown in FIG. 1, a client device may present a task tree in a user interface of a task selection application, such as interface 100. In some implementations, the task tree may include a master task list that includes a list of tasks that a user of the client device may select to execute. For example, the list of tasks may relate to routing instructions that are to be applied to one or more network devices, such as instructions to direct the one or more network devices to provide a particular network service to a data flow, apply filters/rules (e.g., firewall filters/rules) to the data flow, and/or perform some other instruction for the one or more network devices. Additionally, or alternatively, the list of tasks may relate to some other type of task unrelated to routing instructions (e.g., instructions to add/modify/delete a file or directory having particular attributes, generate a document, provide an electronic communication, or the like).

In some implementations, a user may select a task from the master task list (e.g., an initial task). In some implementations, a navigation logging server may receive task navigation information identifying the initial task selection and may provide a suggestion list corresponding to the selected initial task. In some implementations, the suggestion list may correspond to an updated presentation of the task tree to streamline the selection of tasks from the task tree. For example, as shown in interface 100, the client device may present a first suggestion list, received from the navigation logging server (e.g., suggestion list 1), having a list of suggested subsequent tasks that the user may wish to select after selecting the initial task. In some implementations, suggestion list 1 may be based on task navigation information that identifies the user's navigation through the task tree and tracks the user's selections of tasks from the task tree.

In the example shown in FIG. 1, suggest list 1 may include task 1.2, task 3, and task 5.2 when the user selects task 12 as the initial task. For example, based on the user's historical selections, the navigation logging server may determine that the user may be likely to select task 1.2, task 3, or task 5.2 after selecting task 12. That is, the task tree may be updated to present tasks in suggestion list 1 when task 12 is selected (e.g., instead of presenting a static list of tasks, when task 12 is selected, that does not update). In some implementations, the navigation logging server may determine a number of transition counts (e.g., a number of times the user transitioned from one task to another) based on the task navigation information and may generate a suggestion list that includes the tasks in descending order of transition counts.

In some implementations, the user may select a subsequent task from suggestion list 1, or may navigate back to the master task list and select a subsequent task that is not in the suggestion list. In some implementations, the client device may receive a second suggestion list (e.g., suggestion list 2) when the user selects a subsequent task from suggestion list 1. In some implementations, suggestion list 2 may include tasks that the user may wish to select after selecting a task in suggestion list 1 (e.g., based on the task navigation information).

In some implementations, the navigation logging server may update suggestion lists based on determining transition quantities from one task to another from the task navigation information. As a result, the task tree may be updated to present a series of tasks for selection by the user based on the task navigation information, thereby saving time in relation to when the user must navigate through the tasks from within a task tree that does not update.

In some implementations, the client device may provide information identifying task selections (e.g., selections of the initial task and the subsequent tasks) to a task management server to cause the task management server to execute the task. For example, the client device may provide tasks selections as the tasks are selected by the user. Additionally, or alternatively, the user may build a workflow by selecting the tasks, and may instruct the client device to provide the workflow, identifying the selected tasks, to the task management server. Based on receiving the workflow, the task management server may execute the tasks associated with the workflow.

In some implementations, a suggestion lists may be based on user navigation through user interfaces of other formats, including or excluding a task tree, such as user navigation through a breadcrumb user interface, a site map, a global search, a help wizards, or the like.

Figure 2:
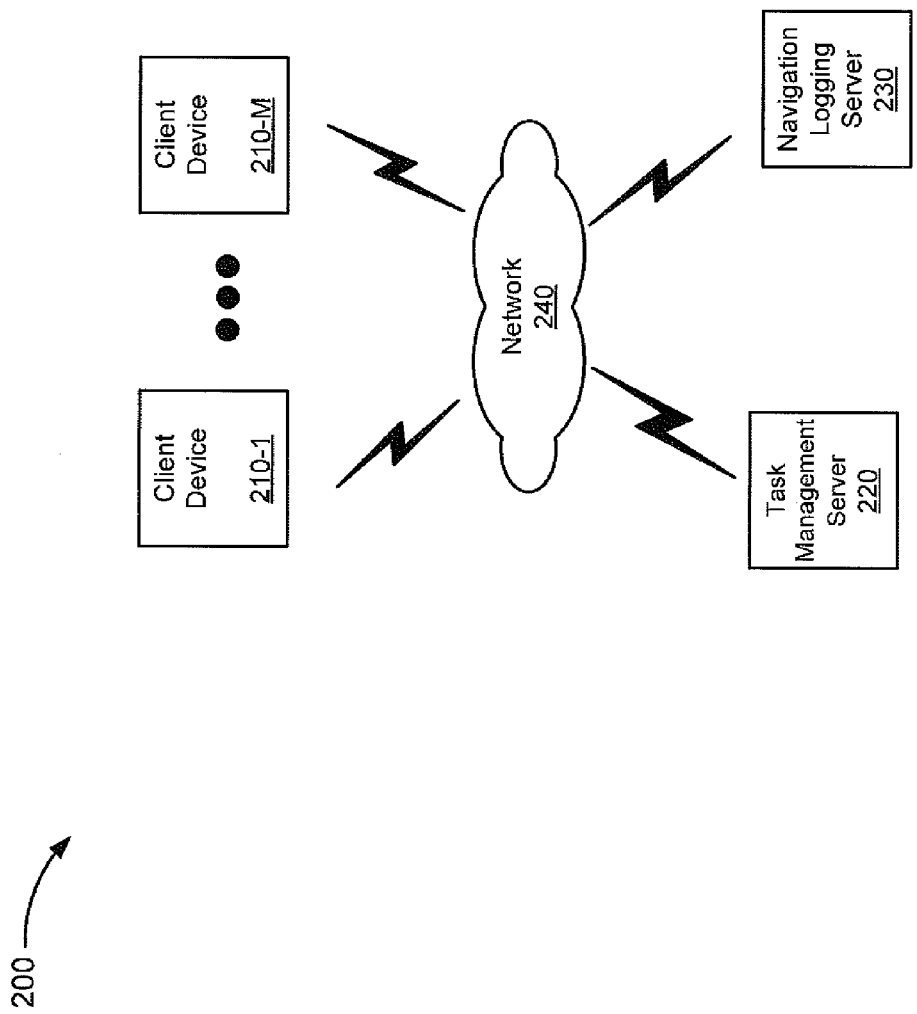
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210-1, . . . , 210-M (where M≥1), task management server 220, navigation logging server 230, and network 240.

Client device 210 may include any device capable of communicating via a network, such as network 240. For example, client device 210 may correspond to a desktop computing device, a server device, a portable computing device (e.g., a laptop or a tablet computer), or another type of computing device. In some implementations, client device 210 may receive task selections from a user of client device 210 (e.g., via a user interface of a task selection application) and may provide the task selections to task management server 220 to cause task management server 220 to execute the selected tasks. In some implementations, client device 210 may provide task navigation information to navigation logging server 230 (e.g., information identifying task selections from an origin task to a destination task) and may receive suggestion lists from navigation logging server 230 based on providing the task navigation information.

Task management server 220 may include one or more computing devices, such as a server device or a collection of server devices. In some implementations, task management server 220 may receive task selections from client device 210 and may execute the selected tasks. For example, task management server 220 may receive task selections that may relate to routing instructions that are to be applied to one or more network devices, such as instructions to direct the one or more network devices to provide a particular network service to a data flow, apply filters/rules (e.g., firewall filters/rules) to the data flow, and/or perform some other instruction for the one or more network devices. Additionally, or alternatively, the task selections may relate to some other type of task unrelated to routing instructions (e.g., instructions to add/modify/delete a file or directory having particular attributes, generate a document, provide an electronic communication, or the like).

Navigation logging server 230 may include one or more computing devices, such as a server device or a collection of server devices. In some implementations, navigation logging server 230 may receive task navigation information from client device 210 and may provide a suggestions list corresponding to a task selected by a user of client device 210. In some implementations, navigation logging server 230 may track task transitions, based on the task navigation information, including a number of times in which the user selected a particular task and subsequently selected another task. In some implementations, navigation logging server 230 may update a suggestion list based on the task navigation information. In some implementations, navigation logging server 230 may discard a transition from an origin task to a destination task when the user selects to cancel the destination task after selection, or when the user navigates away from the destination task within a particular amount of time (e.g., indicating that the user selected the destination task in error).

Network 240 may include one or more wired and/or wireless networks. For example, network 240 may include a local area network (LAN), a wide area network (WAN), a metropolitan network (MAN), a telephone network (e.g., the Public Switched Telephone Network (PSTN) or a cellular network), an ad hoc network, a managed IP network, a virtual private network (VPN), an intranet, the Internet, a fiber optic-based network, and/or a combination of these or other types of networks The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
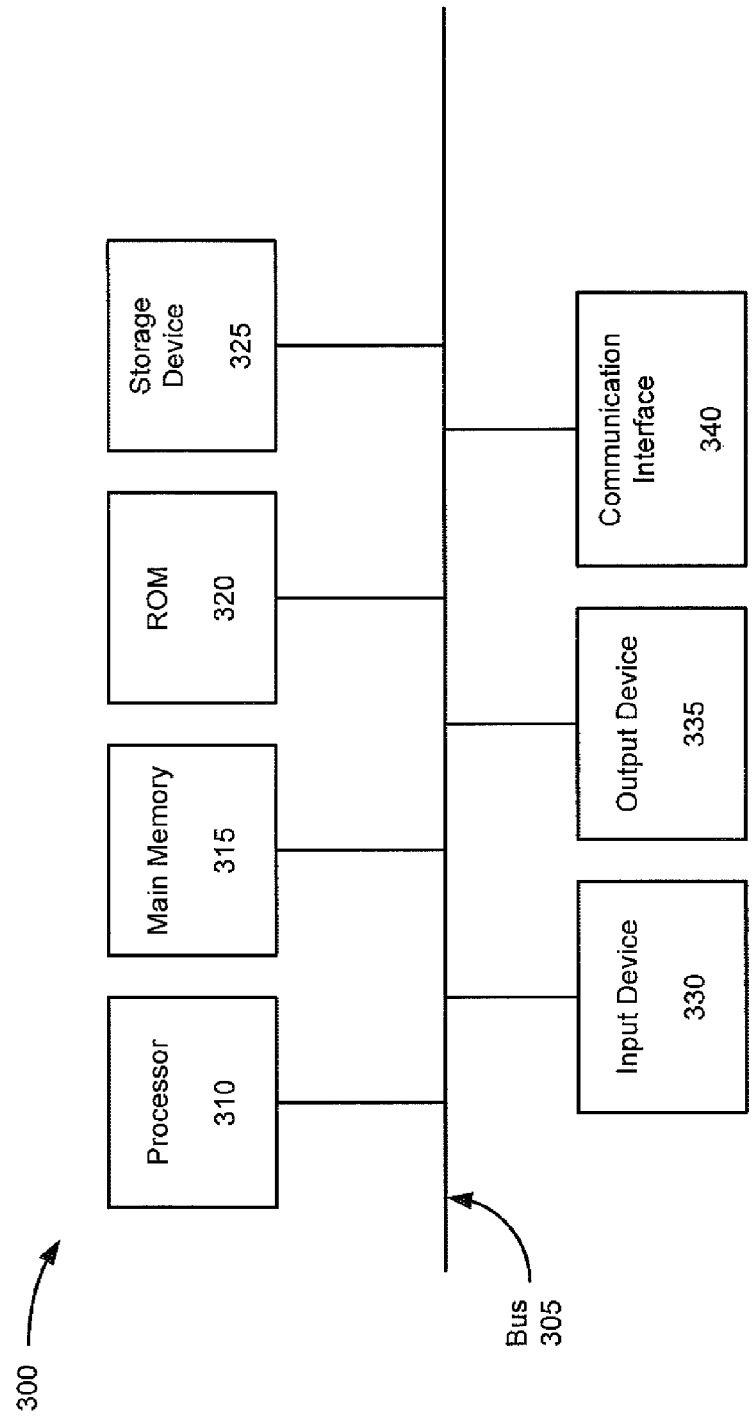
FIG. 3 illustrates example components of a device that may be used within the environment of FIG. 2.

FIG. 3 illustrates example components of a device 300 that may be used within environment 200 of FIG. 2. Device 300 may correspond to client device 210, task management server 220, and/or navigation logging server 230. Each of client device 210, task management server 220, and/or navigation logging server 230 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
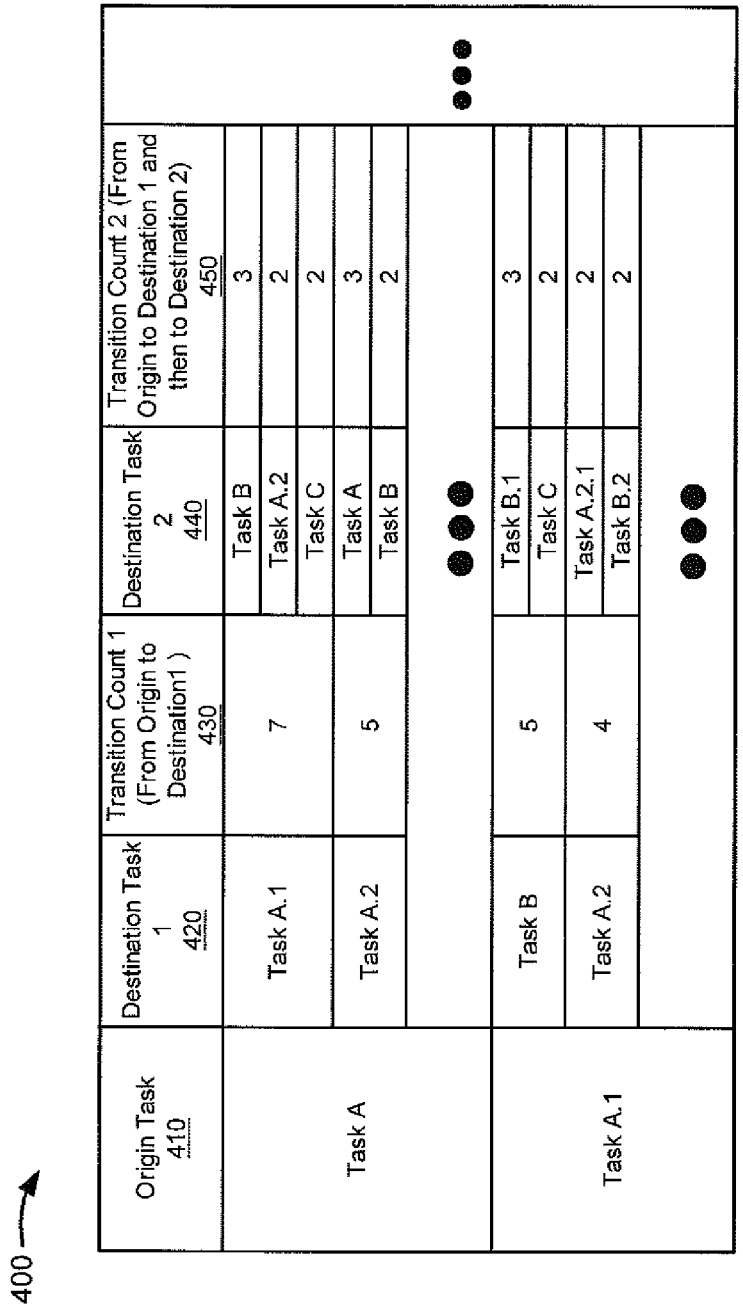
FIG. 4 illustrates an example data structure that may be stored by one or more devices in the environment of FIG. 2.

FIG. 4 illustrates an example data structure 400 that may be stored by one or more devices in environment 200. In some implementations, data structure 400 may be stored in a memory of navigation logging server 230. In some implementations, data structure 400 may be stored in a memory separate from, but accessible by, navigation logging server 230. In some implementations, data structure 400 may be stored by some other device in environment 200, such as client device 210 and/or task management server 220.

A particular instance of data structure 400 may contain different information and/or fields than another instance of data structure 400. In some implementations, data structure 400 may include task transition data based on task navigation information.

As shown in FIG. 4, data structure 400 may include origin task field 410, destination task 1 field 420, transition count 1 field 430, destination task 2 field 440, and transition count 2 field 450.

Origin task field 410 may store information identifying a task selection received by client device 210 (e.g., from a user of client device 210 via a user interface of a task selection application associated with a task tree). For example, origin task field 410 may store an identifier and/or a description of the selected task when client device 210 receives the task selection. In some implementations, information identifying the task stored by origin task field 410 may correspond to an initial task selection (e.g., the first selected task when the task selection application is opened and/or when the user logs in to the task selection application). Alternatively, the information identifying the task stored by origin task field 410 may correspond to a task selected by the user at any time. As an example, assume that client device 210 receives a selection of Task A. Given this assumption, origin task field 410 may store "Task A" in origin task field 410.

Destination task 1 field 420 may store information identifying a first destination task (e.g., destination task 1) selected subsequent to a particular origin task. For example, assume that client device 210 receives a selection of Task A.1 after receiving the selection of the origin task (e.g., Task A). Given this assumption, destination task 1 field 420 may store "Task A.1" in connection with "Task A" stored in origin task field 410.

Transition count 1 field 430 may store information identifying a number of transitions from an origin task to destination task 1 (e.g., a number of times that destination task 1 was selected after the selection of the origin task). For example, assume that client device 210 receives the selection of Task A.1, after receiving the selection of task A, seven times. Given this assumption, destination task 1 field 420 may store the number seven in connection with "Task A" and "Task A.1," stored by origin task field 410 and destination task 1 field 420, respectively, to indicate that Task A.1 was selected seven times after Task A was selected.

Destination task 2 field 440 may store information identifying a second destination task (e.g., destination task 2), selected subsequent to destination task 1 associated with the origin task. For example, assume that client device 210 receives the selection of Task B after receiving the selection of destination task 1 (Task A.1), which was selected after the origin task (Task A). Given this assumption, destination task 2 field 440 may store "Task B" in connection with Task A.1 in destination task 1 field 420 and Task A in origin task field 410.

Transition count 2 field 450 may store information identifying a number of transitions from destination task 1 to destination task 2 (e.g., a number of times that destination task 2 was selected after the selection of the destination task 1). For example, assume that client device 210 receives, three times, the selection of Task B, after receiving the selection of task A.1 (which was received after the selection of Task A). Given this assumption, transition count 2 field 450 may store the number three in connection with "Task A," "Task A.1," and "Task B" stored by origin task field 410, destination task 1 field 420, and destination task 2 field 440, respectively, to indicate that Task B was selected three times after Task A.1 was selected after Task A.

In some implementations, the sum of the transition counts in transition count 2 field 450, for a particular destination task 1, may equal the number of transition counts stored by destination task 1 field 420 for the particular destination task 1. In an example shown in FIG. 4, transition count 1 field 430 may store a transition count of seven indicating that Task A.1 was selected seven times after the origin task (e.g., Task A) was selected. In connection with a particular destination task 1 (e.g., Task A.1), transition count 2 field 450 may store transition counts of three, two, and two, corresponding to destination tasks 2 (e.g., Task B, Task A.2, and Task C), indicating that three of the seven times that Task A.1 was selected after Task A, Task B was selected after Task A.1, two of the seven times that Task A.1 was selected after Task A, Task A.2 was selected after Task A.1, and two of the seven times that Task A.1 was selected after Task A, Task C was selected after Task A.1. In some implementations, the sum of the transition counts in transition count 1 field 430 and/or transition count 2 field 240 may be based on selections of tasks made by a single particular user or selections made by a group of users (e.g., users that may or may not share the same role as the particular user).

In some implementations, information identifying a task, stored by origin task field 410, may correspond to information identifying a task stored by destination task 1 field 420 or destination task 2 field 440. For example, as shown in FIG. 4, destination task 1 field 420 may store "Task A.1" indicating a selection of Task A.1 after Task A. Further, origin task field 410 may store "Task A.1" to identify first destination tasks selected after Task A.1 and second destination tasks selected after the first destination tasks associated with task A.1. In some implementations, some or all of destination task 1 field 420 through transition count 2 field 450 may not store any information, for example, when no task was selected after a particular origin task or destination task.

In some implementations, some transitions from one task to another task may not be counted or a transition count may be discarded (e.g., when a task is selected but is cancelled and/or when a user navigates away from a selected task within a particular amount of time). In some implementations, a transition from one task to another task may not be counted until the task has completed execution and/or until a particular amount of time has elapsed since the selection of the task (e.g., an amount of time that allows for the completion of the task).

In some implementations, information stored by data structure 400 may be used to generate task suggestion lists. For example, when client device 210 receives a selection of Task A, navigation logging server 230 may provide a task suggestion list that includes Task A.1 and Task A.2 (e.g., based on information stored by data structure 400 corresponding to historical selections after the selection of Task A).

Further, when client device 210 receives a selection of Task A.1 after receiving the selection of Task A, navigation logging server 230 may provide another task suggestion list that includes Task B, Task A.2, and Task C. In some implementations, the task suggestion lists may be presented as branches in a task tree, may dynamically update as transition counts between tasks are counted, and may reduce time in selecting tasks in relation to when tasks are to be selected from a task tree having a static list of tasks.

In some implementations, the task suggestion list may be based on a particular user's group. For example, a first user may be presented with a first task suggestion list that includes tasks associated with a group or department associated with the first user. A second user may be presented with a second task suggestion list that includes tasks associated with a group or department associated with the second user. In some implementations, a user may select a particular group in order to receive a task suggestion list associated with the selected group.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
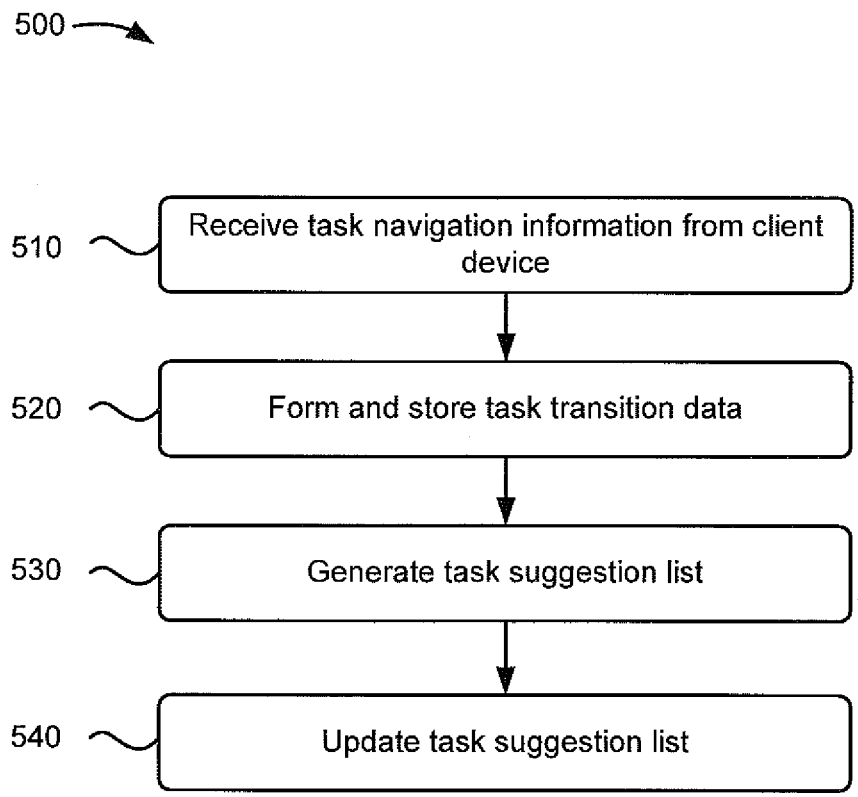
FIG. 5 illustrates a flowchart of an example process for generating and updating a task suggestion list associated with a task tree.

FIG. 5 illustrates a flowchart of an example process 500 for generating and updating a task suggestion list associated with a task tree. In one implementation, process 500 may be performed by one or more components of navigation logging server 230. In another implementation, some or all of blocks of process 500 may be performed by one or more components of another device in environment 200 (e.g., client device 210 and/or task management server 220), or a group of devices including or excluding navigation logging server 230.

As shown in FIG. 5, process 500 may include receiving task navigation information from a client device (block 510). For example, navigation logging server 230 may receive the task navigation information from client device 210. In some implementations, the task navigation information may include indications of selections of tasks received by client device 210 (e.g., from a user of client device 210 via a user interface associated with a task selection program). In some implementations, the user interface of the task selection program may present the tasks for selection in a task tree. In some implementations, the user may navigate through the task tree (e.g., by expanding/collapsing tasks in the task tree) to access and select particular tasks listed in the task tree. In some implementations, the task navigation information may include other information relating to task navigation activity. For example, the task navigation information may include information identifying keystrokes, cursor movements, mouse clicks, etc. In some implementations, navigation logging server 230 may continuously monitor navigation activity of client device 210 to receive the task navigation information. Additionally, or alternatively, client device 210 may provide the task navigation information based on receiving a selection of a task.

Process 500 may also include forming and storing task transition data (block 520). For example, navigation logging server 230 may form the task transition data based on the task navigation information. In some implementations, navigation logging server 230 may form the transition data by counting transitions from one task to another and determine a transition count to identify a number of times that the user transitioned from one task to another (e.g., transitions from an origin task to a destination task). For example, navigation logging server 230 may determine (e.g., based on the task navigation information), that a first task has been selected (e.g., when a series of keystrokes, cursor movements, and/or mouse clicks corresponds to the selection of the first task and/or when client device 210 provides an indication of the selection of the first task). Similarly, navigation logging server 230 may determine that a second task has been selected after the first task has been selected and may store (e.g., in data structure 400), information that identifies that the second task has been selected after the first task.

In some implementations, navigation logging server 230 may maintain a transition count between the first task and the second task to identify a number of times that the user transitions from the first task to the second task. Similarly, navigation logging server 230 may maintain transition counts between the second task and a third task, from the third task to a fourth task, etc. In some implementations, navigation logging server 230 may store the task transition data in data structure 400.

In some implementations, some transitions from one task to another task may not be counted or a transition count may be discarded. For example, a transition from a first task to a second task may not be counted (either not added to a corresponding transition count between the first task and second task or subtracted from the transition count after having been added) when the second task is selected, after the first task, but is cancelled and/or when the navigation information indicates that the user navigates away from the second task within a particular amount of time (e.g., indicating that the user may have erroneously selected the second task). In some implementations, the transition from the first task may not be counted when the second task is selected, but enters an idle or time-out state (e.g., indicating that the user did not execute the second task or did not perform operations associated with the second task). In some implementations, a transition from one task to another task may not be counted until the task has completed execution (e.g., by task management server 220) and/or until a particular amount of time has elapsed since the selection of the task (e.g., an amount of time that allows for the completion of the task).

Process 500 may further include generating a task suggestion list (block 530). For example, navigation logging server 230 may generate a task selection list based on the task transition data stored by data structure 400. In some implementations, navigation logging server 230 may generate a task suggestion list for each origin task. In some implementations, the task suggestion list may include a list of destination tasks associated with the origin task (e.g., tasks that have been historically selected after the selection of the origin task). In some implementations, the task suggestion list may be sorted in descending order based on transition counts of the destination tasks. In some implementations, navigation logging server 230 may provide the task suggestion list based on receiving an indication of a selection of the origin task. In some implementations, navigation logging server 230 may generate a task suggestion list for each first destination task having a list of second destination tasks that have been historically selected after selection of the first destination task.

Process 500 may also include updating a task suggestion list (block 540). For example, navigation logging server 230 may update a task suggestion list as task navigation information, identifying the selection of tasks, is received by navigation logging server 230. In some implementations, navigation logging server 230 may update transition counts for task transitions based on the task navigation information. In some implementations, navigation logging server 230 may re-order tasks in the task suggestion list as transition counts of the task are updated.

In some implementations, task suggestion lists may be presented in a user interface of client device 210 as part of a task tree. For example, when client device 210 receives a selection of a task, navigation logging server 230 may provide a task suggestion list corresponding to the selected task. As described above, task suggestion lists may be presented as branches in a task tree, may be dynamically updated as transition counts between tasks are counted, and may reduce time in selecting tasks in relation to when tasks are to be selected from a task tree having a static list of tasks. In some implementations, the task suggestion lists may be presented in some other format other than a task tree, and may be presented via a button on a user interface of client device 210.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 6A:
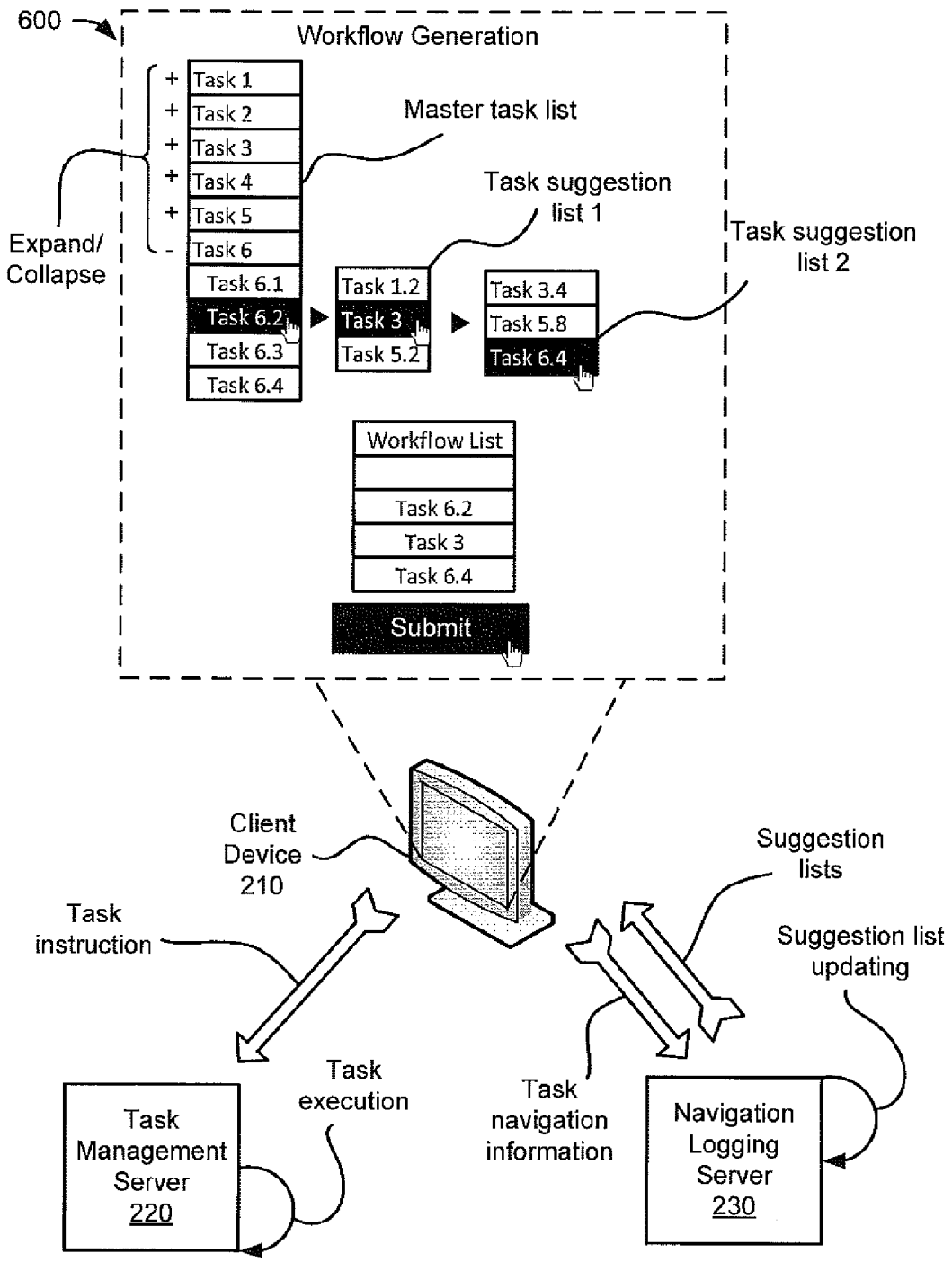
FIGS. 6A-6B illustrate an example implementation as described herein.
Figure 6B:
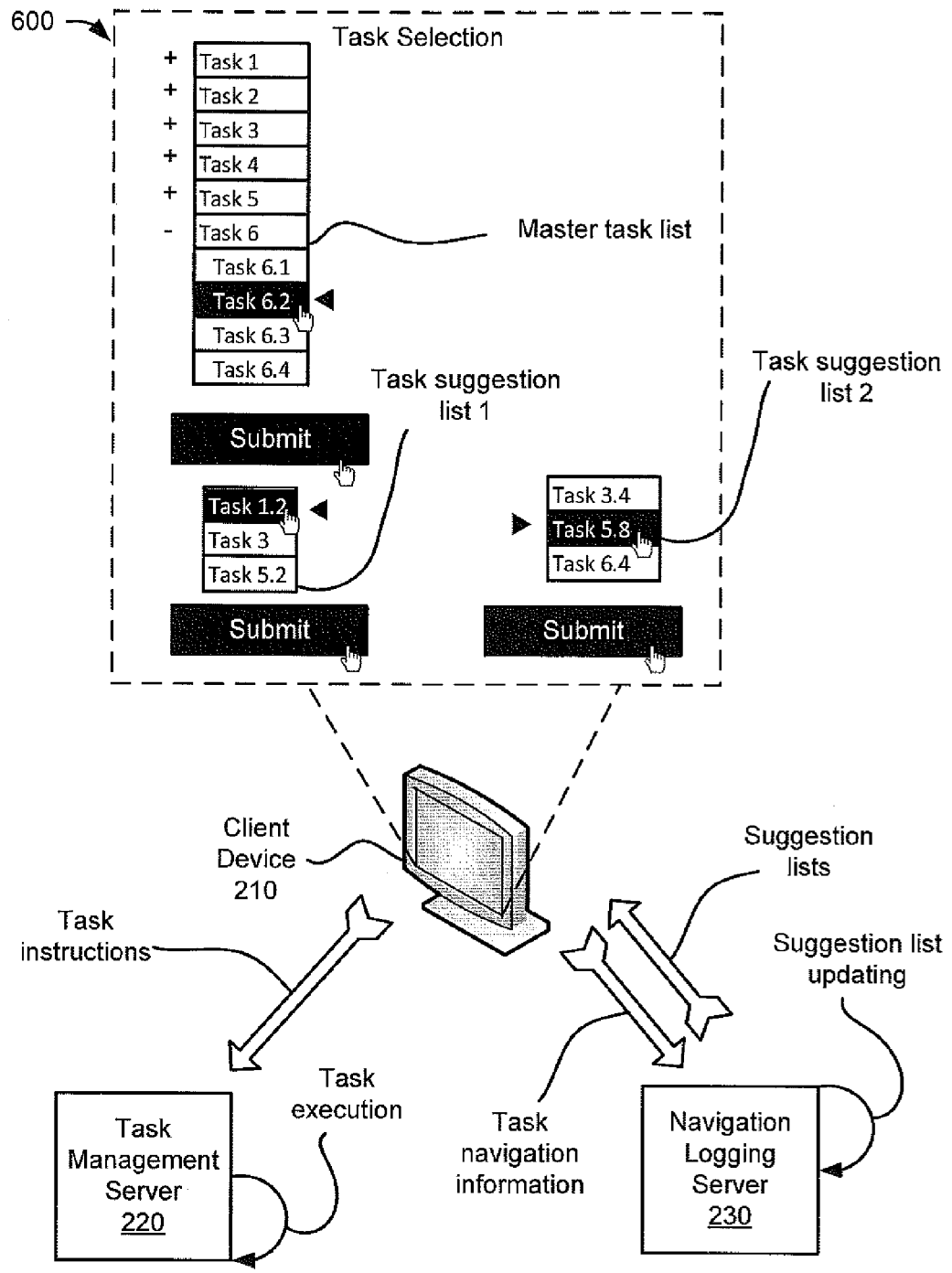

FIGS. 6A-6B illustrate an example implementation as described herein. As shown in FIG. 6A, client device 210 may present a master task list in interface 600 associated with a task selection application. In some implementations, parent tasks in the master task list may be expanded to display a task tree having sub-tasks associated with a corresponding parent task. For example, Task 6 may be expanded to display the sub-tasks Task 6.1, Task 6.2, Task 6.3, and Task 6.4. Further, Task 6.1, Task 6.2, Task 6.3, and Task 6.4 may each be expanded to display respective sub-tasks, and so forth.

In some implementations, navigation logging server 230 may receive a selection of a task (e.g., a parent task or a sub-task) via interface 600. For example, client device 210 may receive a selection of a task (e.g., Task 6.2) listed in a master task list associated with a task tree. In some implementations, Task 6.2 may be added to a workflow list. In some implementations, navigation logging server 230 may receive task navigation information and may identify the selection of Task 6.2. Based on identifying the selection of Task 6.2, navigation logging server 230 may provide a first task suggestion list (e.g., task suggestion list 1) that includes a list of tasks that have historically been selected subsequent to the selection of Task 6.2 (e.g., based on information stored by data structure 400). As an example, assume that Task 1.2, Task 3, and Task 5.2 have been selected subsequent to Task 6.2. Given this assumption, task suggestion list 1 may include Task 1.2, Task 3, and Task 5.2.

As further shown in FIG. 6A, client device 210 may receive a selection of Task 3 after receiving the selection of Task 6.2. In some implementations, Task 3 may be added to the workflow list. In some implementations, navigation logging server 230 may identify the selection of Task 3 based on the task navigation information and may add to a transition count, stored by data structure 400, identifying a number of times that Task 3 was selected after Task 6.2. In some implementations, navigation logging server 230 may update task suggestion list 1 to reflect the addition to the transition count and may re-order the arrangement of the tasks in task suggestion list 1 when task suggestion list 1 is later provided (e.g., when Task 6.2 is selected at another time).

In some implementations, navigation logging server 230 may provide task suggestion list 2 including a list of tasks that have been historically selected after Task 3. In some implementations, task suggestion list 2 may include tasks that were selected after Task 3, and when Task 3 was selected after Task 6.2. Alternatively, or additionally, task suggestion list 2 may include tasks that were selected after Task 3 even if Task 3 was not selected after Task 6.2. That is, Task 3 may be treated as an origin task, or as a first destination task, and suggestion list 2 may include tasks that were selected after Task 3 as an origin task or as a first destination task.

In some implementations, client device 210 may receive the selection of Task 6.4 after receiving the selection of Task 3. In some implementations, Task 6.4 may be added to the workflow list. In some implementations, navigation logging server 230 may identify the selection of Task 6.4 based on the task navigation information and may add to a transition count, stored by data structure 400, identifying a number of times that Task 6.4 was selected after Task 3. In some implementations, navigation logging server 230 may provide a task suggestion list based on identifying the selection of Task 6.4 (e.g., in a similar manner as described above).

As shown in FIG. 6A, task suggestion list 1 and task suggestion list 2 may be presented as branches off of the master task list, thereby forming a dynamic task tree that may update as transition counts from one task to another update (e.g., based on task navigation information that identifies the selection of tasks).

In some implementations, client device 210 may receive selections of tasks that are not in a suggestion list. For example, a user of client device 210 may navigate through the master task list to expand and/or collapse tasks to select a task that is not in a suggestion list. In some implementations, navigation logging server 230 may store information identifying the transition from a first task to a second task, whether or not the second task was selected from a task suggestion list or from navigation through the master task list.

In the example shown in FIG. 6A, client device 210 may receive a selection to provide a task instruction having the workflow list (e.g., including a list identifying Task 6.2, Task 3, and Task 6.4) to task management server 220 to cause task management server 220 to execute the tasks identified in the workflow. For example, the task instruction may include a batch processing instruction to execute a batch of tasks included in the workflow list. Alternatively, client device 210 may provide task instructions to task management server 220 as task selections are received by client device 210. That is, task management server 220 may receive individual task instructions for each task selection, rather than receiving a task instruction including a batch processing instruction to execute a batch of tasks included in a workflow list.

In some implementations, client device 210 may receive a selection of a task and receive an instruction to cause task management server 220 to execute the selected task (e.g., a task instruction). For example, referring to FIG. 6B, client device 210 may receive a selection of Task 6.2 and a task instruction to cause task management server 220 to execute Task 6.2 (e.g., as indicated by the "Submit" selection received by client device 210 after receiving the selection of Task 6.2). In some implementations, navigation logging server 230 may identify the selection of Task 6.2 and the selection to provide the task instruction and may provide task suggestion list 1 having a list of tasks that have been historically selected after Task 6.2. Similarly, navigation logging server 230 may identify the selection of Task 1.2 and a selection to provide a task instruction to cause task management server 220 to execute Task 1.2. Further, navigation logging server may provide task suggestion list 2 corresponding to a list of tasks that have been historically selected after Task 1.2. Similarly, navigation logging server 230 may identify the selection of Task 5.8 (e.g., after the selection of Task 1.2), and a selection to provide a task instruction to cause task management server 220 to execute Task 5.8.

In some implementations, client device 210 may receive a selection to cancel a task or may receive user input that navigates away from an application or interface associated with the execution of the task. As described above, navigation logging server 230 may not count the selection of a task that has been cancelled and/or a task in which user input navigates away from an application or interface associated with the execution of the task.

While a particular example is shown in FIGS. 6A-6B, the above description is merely an example implementation. In practice, other examples are possible from what is described above in FIGS. 6A-6B. Also, while a particular format of interface 600 is shown, in practice, interface 600 may have a different format and appearance than what is shown in FIG. 6. For example, interface 600 may present information regarding tasks and/or tasks suggestion list in a ribbon, one or more floating containers, a tag cloud, or the like.

As described above, navigation logging server 230 may determine a number of transition counts (e.g., a number times the user transitioned from one task to another task) based on task navigation information and may generate a suggestion list that includes suggested tasks in descending order of transition counts. In some implementations, navigation logging server 230 may update suggestion lists based on determining transition counts from one task to another task. As a result, a task tree may be updated to present a series of tasks for selection by a user based on the task navigation information, thereby saving time in relation to when the user must navigate through the tasks from within a task tree that does not update.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
receiving, by a device, task navigation information;
identifying, by the device, a selection of a first task, of a plurality of tasks, based on the task navigation information,
the plurality of tasks corresponding to a plurality of routing instructions that are to be applied to one or more network devices;
providing, by the device, a list of tasks from the plurality of tasks, based on identifying the selection of the first task,
the list of tasks being based on information identifying tasks historically selected subsequent to the selection of the first task;
identifying, by the device and based on the task navigation information, a selection of a second task, of the plurality of tasks, subsequent to identifying the selection of the first task; and
storing, by the device, information indicating that the second task has been selected subsequent to the first task based on identifying the selection of the second task subsequent to the selection of the first task,
the information indicating that the second task has been selected subsequent to the first task including a number of times that the second task has been selected subsequent to the first task,
the number of times, that the second task has been selected subsequent to the first task, being incremented when a particular amount of time has elapsed after identifying the selection of the second task,
the number of times, that the second task has been selected subsequent to the first task, not being incremented when a condition is satisfied, the condition being included in a group of conditions comprising:
a first condition indicating that the second task is navigated away from within the particular amount of time,
a second condition indicating that the second task enters an idle state after the second task has been selected, and
a third condition indicating that the second task is not completely executed within the particular amount of time,
the information indicating that the second task has been selected subsequent to the first task corresponding to the information identifying tasks historically selected subsequent to the selection of the first task.

2. The method of claim 1, where the task navigation information includes an indication that the first task or the second task has been selected.

3. The method of claim 1, further comprising:
adding to the number of times that the second task has been selected subsequent to the first task based on identifying that the second task has been selected subsequent to the first task.

4. The method of claim 1, further comprising:
adding to the number of times that the second task has been selected subsequent to the first task based on identifying that the second task has been selected subsequent to the first task;
determining, based on the task navigation information, that the second task has been cancelled; and
subtracting from the number of times that the second task has been selected subsequent to the first task based on determining that the second task has been cancelled.

5. The method of claim 1, further comprising:
determining that the second task has been completed; and
adding to the number of times that the second task has been selected subsequent to the first task based on determining that the second task has been completed.

6. The method of claim 1, further comprising:
determining that the particular amount of time has not elapsed after identifying the selection of the second task,
the number of times, that the second task has been selected subsequent to the first task, not being incremented, based on determining that the particular amount of time has not elapsed.

7. The method of claim 1, where the first task and the second task are added to a workflow,
the workflow being executed to execute the first task and the second task.

8. The method of claim 1, where the first task or the second task relate to:
the plurality of routing instructions that are to be applied to the one or more network devices,
routing instructions to apply filters or a rule to a data flow,
instructions to add, modify, or delete a file or directory having particular attributes,
instructions to generate a document, or
instructions to provide an electronic communication.

9. A system comprising:
a device comprising a processor configured to:
receive task navigation information;
determine a selection of a first task, of a plurality of tasks, based on the task navigation information,
the plurality of tasks corresponding to a plurality of routing instructions that are to be applied to one or more network devices;
provide a list of tasks, of the plurality of tasks, based on determining the selection of the first task,
the list of tasks being based on information identifying tasks historically selected subsequent to the selection of the first task;
determine, based on the task navigation information, a selection of a second task, of the plurality of tasks subsequent to determining the selection of the first task; and
store information identifying that the second task has been selected subsequent to the first task based on determining the selection of the second task subsequent to the selection of the first task,
the information identifying that the second task has been selected subsequent to the first task including a number of times that the second task has been selected subsequent to the first task,
the number of times, that the second task has been selected subsequent to the first task, being incremented when a particular amount of time has elapsed after determining the selection of the second task,
the number of times, that the second task has been selected subsequent to the first task, not being incremented when a condition is satisfied, the condition being included in a group of conditions comprising:
a first condition indicating that the second task is navigated away from within the particular amount of time,
a second condition indicating that the second task enters an idle state after the second task has been selected, and a third condition indicating that the second task is not completely executed within the particular amount of time, the information identifying that the second task has been selected subsequent to the first task corresponding to the information identifying tasks historically selected subsequent to the selection of the first task.

10. The system of claim 9, where the task navigation information includes an indication that the first task or the second task has been selected.

11. The system of claim 9, where the processor is further configured to:
   determine, based on the task navigation information, that the second task has been cancelled; and
   subtract from the number of times that the second task has been selected subsequent to the first task based on determining that the second task has been cancelled.

12. The system of claim 9, where the processor is further configured to:
   determine that the second task has been completed; and
   add to the number of times that the second task has been selected subsequent to the first task, based on determining that the second task has been completed.

13. The system of claim 9, where the processor is further configured to:
   determine that the particular amount of time has not elapsed after the identifying the selection of the second task,
      the number of times, that the second task has been selected subsequent to the first task, not being incremented, based on determining that the particular amount of time has not elapsed.

14. The system of claim 9, where the first task and the second task are added to a workflow,
   the workflow being executed to execute the first task and the second task.

15. The system of claim 9, where the first task or the second task relate to:
   the plurality of routing instructions that are to be applied to the one or more network devices,
   routing instructions to apply filters or a rule to a data flow,
   instructions to add, modify, or delete a file or directory having particular attributes,
   instructions to generate a document, or
   instructions to provide an electronic communication.

16. A non-transitory computer-readable medium for storing instructions, the instructions comprising:
   a plurality of instructions which, when executed by one or more processors associated with a device, cause the one or more processors to:
      receive a selection of a first task of a plurality of tasks,
         the plurality of tasks corresponding to a plurality of routing instructions that are to be applied to one or more network devices;
      provide a list of tasks, of the plurality of tasks, based on receiving the selection of the first task,
         the list of the tasks being based on information identifying tasks historically selected subsequent to the selection of the first task;
      receive a selection of a second task, of the plurality of tasks, subsequent to receiving the selection of the first task; and
      store information identifying that the second task has been selected subsequent to the first task based on receiving the selection of the second task subsequent to the selection of the first task,
         the information identifying that the second task has been selected subsequent to the first task including a number of times that the second task has been selected subsequent to the first task,
            the number of times, that the second task has been selected subsequent to the first task, being incremented when a particular amount of time has elapsed after the selection of the second task,
            the number of times, that the second task has been selected subsequent to the first task, not being incremented when a condition is satisfied, the condition being included in a group of conditions comprising:
               a first condition indicating that the second task is navigated away from within the particular amount of time,
               a second condition indicating that the second task enters an idle state after the second task has been selected, and
               a third condition indicating that the second task is not completely executed within the particular amount of time,
         the information identifying that the second task has been selected subsequent to the first task corresponding to the information identifying tasks historically selected subsequent to the selection of the first task.

17. The non-transitory computer-readable medium of claim 16, where the plurality of instructions further cause the one or more processors to:
   add to the number of times that the second task has been selected subsequent to the first task based on receiving the selection of the second task subsequent to receiving the selection of the first task.

18. The non-transitory computer-readable medium of claim 16, where the plurality of instructions further cause the one or more processors to:
   add to the number of times that the second task has been selected subsequent to the first task based on receiving the selection of the second task subsequent to receiving the selection of the first task;
   determine that the second task has been cancelled; and
   subtract from the number of times that the second task has been selected subsequent to the first task based on determining that the second task has been cancelled.

19. The non-transitory computer-readable medium of claim 16, where the plurality of instructions further cause the one or more processors to:
   determine that the second task has been completed; and
   add to the number of times that the second task has been selected subsequent to the first task based on determining that the second task has been completed.

20. The non-transitory computer-readable medium of claim 16, where the plurality of instructions further cause the one or more processors to:
   determine that the particular amount of time has not elapsed after the receiving the selection of the second task,
      the number of times, that the second task has been selected subsequent to the first task, not being incremented, based on determining that the particular amount of time has not elapsed.

* * * * *